(12) United States Patent
Jindal et al.

(10) Patent No.: US 10,701,434 B1
(45) Date of Patent: Jun. 30, 2020

(54) EXTRACTING SESSION INFORMATION FROM VIDEO CONTENT TO FACILITATE SEEKING

(71) Applicant: Adobe Inc., San Jose, CA (US)

(72) Inventors: Amol Jindal, Patiala (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/253,120

(22) Filed: Jan. 21, 2019

(51) Int. Cl.
*H04H 60/32* (2008.01)
*H04N 21/431* (2011.01)
*G06N 3/08* (2006.01)
*H04N 21/433* (2011.01)
*H04N 21/44* (2011.01)

(52) U.S. Cl.
CPC ........... *H04N 21/4316* (2013.01); *G06N 3/08* (2013.01); *H04N 21/433* (2013.01); *H04N 21/44008* (2013.01)

(58) Field of Classification Search
None
See application file for complete search history.

(56) References Cited

U.S. PATENT DOCUMENTS

| | | | | |
|---|---|---|---|---|
| 6,608,930 | B1* | 8/2003 | Agnihotri | G06K 9/3266 382/176 |
| 9,179,116 | B1* | 11/2015 | Liao | G11B 27/28 |
| 9,888,279 | B2* | 2/2018 | Ishtiaq | H04N 21/23418 |
| 2004/0255249 | A1* | 12/2004 | Chang | G06K 9/3266 715/723 |
| 2009/0083787 | A1* | 3/2009 | Morris | H04N 5/44543 725/32 |
| 2010/0262912 | A1* | 10/2010 | Cha | G11B 27/105 715/719 |
| 2012/0237182 | A1* | 9/2012 | Eyer | H04N 5/783 386/241 |
| 2013/0311595 | A1* | 11/2013 | Milatinovici | H04N 21/26275 709/214 |
| 2014/0201773 | A1* | 7/2014 | Neumeier | H04N 5/44591 725/19 |
| 2014/0270708 | A1* | 9/2014 | Girgensohn | H04N 9/79 386/282 |
| 2016/0110877 | A1* | 4/2016 | Schwartz | G06T 7/20 382/107 |
| 2016/0291860 | A1* | 10/2016 | Higuchi | G06F 3/04883 |
| 2018/0096457 | A1* | 4/2018 | Savvides | G06K 9/6267 |

* cited by examiner

*Primary Examiner* — William J Kim
(74) *Attorney, Agent, or Firm* — SBMC (57) ABSTRACT

A seek content extraction system analyzes frames of video content and identifies locations in the frames where session information is displayed. This session information refers to information that is displayed as part of video content and that describes, for a particular location in the video content, what is currently happening in the video content at that particular location. This session information is extracted from each of multiple frames, and for a given frame the extracted session information is associated with the frame. While the user is seeking forward or backward through the video content, a thumbnail of the frame at a given location in the video content is displayed along with the extracted session information associated with the frame.

20 Claims, 6 Drawing Sheets

EXTRACTING SESSION INFORMATION FROM VIDEO CONTENT TO FACILITATE SEEKING

BACKGROUND

As computer technology has advanced and computers have become increasingly commonplace in our lives, the creation and sharing of digital content has increased. This digital content includes video content, such as movies, sporting events, television broadcasts, home movies, and so forth. Video playback devices and applications oftentimes include a seek function that allows users to move forward and/or backward through the video content to find a particular location in the video content that they desire to watch. To facilitate finding their desired location, thumbnails of the video content are sometimes displayed to the user. The thumbnail corresponding to any given location of the video content is a small image (e.g., 10-20% of the size of the video content display) of the video content at that location. These thumbnails can facilitate finding a particular location in some video content because they give the user views of the scenes in the video content at different locations as the user seeks forward or backward through the video content.

While these thumbnails can be helpful for some video content, they are not without their problems. One such problem is that the scenes in some video content do not change very much, which makes the thumbnails not very informative. For example, various different sporting events, such as soccer games, basketball games, baseball games, and so forth typically display the same field or court with players wearing one of two different uniforms. Simply looking at thumbnails of different locations in the video content does not give the user much information to find his or her desired location in the video content because the different thumbnails look so similar. This makes it difficult for a user to find his or her desired location in the video content, leading to user frustration with their computers.

SUMMARY

To mitigate the problem of thumbnails not being very informative when seeking through video content, a seek content extraction system is employed to generate session information for each of multiple frames of the video content. The session information comprises information that is displayed as part of the frame and that describes what is currently happening in the video content at the frame. For each of the multiple frames of the video content, the seek content extraction system extracts the session information from the frame and associates the extracted session information with the frame. The session information is displayed along with a thumbnail of the frame when the user is seeking through the video content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Video playback devices and applications oftentimes include a seek function that allows users to move forward and/or backward through video content to find a particular location in the video content that they desire to watch. To support the seek function, a seek bar or other display can allow users to select the location of the video content they desire to seek to (e.g., resume playback of the video content at). To facilitate finding their desired location, thumbnails of the video content at various locations can be displayed to the user. Conventional techniques and systems for displaying thumbnails, however, provide little to no benefit to users for certain types of video content. Accordingly, video playback devices and applications that employ these conventional techniques are confronted with inefficient use of computational resources in providing a seek display to users.

For example, in a sporting event such as a soccer game the video content includes the same field with players wearing one of two different uniforms for the duration of the video content. Simply looking at thumbnails of different locations in the video content for a soccer game does not give the user much information to find his or her desired location in the video content because the different thumbnails look very similar—they all have the same field with players wearing the same uniforms.

To overcome these challenges, session information is extracted from video content to facilitate seeking. A seek content extraction system obtains video content and extracts session information from multiple frames of the video content. The session information includes information that is displayed as part of the video content. For example, if the video content is a sporting event, then the session information can include information on a game information card that is displayed as part of the video content. The game information card includes various information regarding the current status of the game, such as the teams playing, the score for each team, an amount of time remaining in the game or a period of the game, and so forth. By way of another example, if the video content is a conference with a panel of several different speakers at a table, then the session information can include one or both of the name of the speaker and the current topic that is displayed as part of the video content.

Generally, the seek content extraction system analyzes frames of video content and identifies locations in the frames where session information is displayed. This session information is extracted from each of multiple frames, and for a given frame the extracted session information is associated with the frame. While the user is seeking forward or backward through the video content, a thumbnail of the frame at a given location in the video content is displayed along with the extracted session information associated with the frame.

More specifically, the seek content extraction system includes a content localization system, a content extraction system, and a seek display system. The content localization system identifies, for a given frame of video content, a region in the frame where session information is displayed. This region identification can take various forms, such as coordinates of two opposite corners of a rectangular area that is the display of the session information. The content localization system is implemented at least in part by a machine learning system trained to identify a region (e.g., a rectangle) in a frame of video content that is the session information for the frame, and to output the location of the identified region as well as a confidence score indicating how likely it is that the identified region is the session information for the frame.

The machine learning system of the content localization system is, in one or more implementations, a regional convolutional neural network (R-CNN). The R-CNN is trained on frames of video content to identify candidate regions of the frames that are the session information. After training, the R-CNN receives a frame of video content and generates an output that is the location of a candidate region of the frame that is the session information as well as a confidence score indicating how likely it is that the candidate region is the session information for the frame.

The content localization system also optionally includes an additional machine learning system, which in one or more implementations is a support vector machine (SVM), that operates as a verification stage for the output of the R-CNN. The SVM is also trained on frames of video content to identify whether regions of the frames are session information. After training the SVM, the location of the candidate region identified by the R-CNN for a frame is input to the SVM, and the SVM generates a classification for the candidate region that indicates whether the candidate region is (or is not) the session information for the frame. In one or more implementations, the SVM verifies whether the candidate region identified by the R-CNN is the session information in situations in which the confidence score that the candidate region is the session information as generated by the R-CNN is below a threshold amount (e.g., below 50%). In situations in which the confidence score that the candidate region is the session information as generated by the R-CNN is not below the threshold amount, the SVM need not classify the candidate region and the location of the candidate region is output by the content localization system as the location of the session information.

The output of the content localization system is the location of the candidate region of the frame that is the session information as well as an indication of the likelihood that the candidate region is the session information for the frame. This indication of the likelihood that the candidate region is the session information for the frame can be the confidence score generated by the R-CNN, or the classification for the candidate region that indicates whether the candidate region is (or is not) the session information for the frame generated by the SVM.

The content extraction system extracts, for each of multiple frames of the video content, the session information from the frame. The content extraction system receives from the content localization system the location of the region of the frame that is the session information as well as the indication of the likelihood that the region is the session information for the frame. The content extraction system copies the video content in the region based on the indication of the likelihood that the region is the session information for the frame. If the indication of the likelihood that the region is the session information for the frame is that the region is not the session information for the frame, or if the confidence score that the region is the session information for the frame is below a threshold amount (e.g., 60%), then the content extraction system does not copy the video content in the region. Rather, the content extraction system determines that there is no session information for that frame. However, if the indication of the likelihood that the region is the session information for the frame is that the region is the session information for the frame, or if the confidence score that the region is the session information for the frame is above a threshold amount (e.g., 60%), then the content extraction system copies the video content in the region as the session information for the frame.

The seek display system maintains the session information extracted from the frames of the video content by the content extraction system. This session information for a frame can be maintained in various different manners, such as one or more of stored as metadata associated with the frame or a thumbnail of the frame, stored in a database or record that associates the frame or thumbnail of the frame (e.g., identified by a frame number or timestamp) with the session information, displayed along a seek bar along with the thumbnail for the frame, and so forth.

The seek content extraction system also optionally includes a significant content location identification system. The significant content location identification system identifies locations in the video content that are predicted by the significant content location identification system to be significant to a user. For example, a location in the video content where a score change occurs can be a location that is predicted to be significant to a user. The significant content location identification system expects the session information to not change too frequently, so changes in the session information can be used to identify when something has happened in the video content that is predicted to be significant to the user. The significant content location identification system identifies significant content locations by identifying changes in the extracted session information for two frames. Session information is extracted from frames of the video content at a particular rate, such as once every 30 frames (session information is extracted from every $30^{th}$ frame). If the difference between a first extracted session information and a second consecutively extracted session information is large enough, then the frame from which the second session information was extracted is predicted to be a significant content location. Whether a difference is large enough can be determined in various manners, such as whether the difference is greater than a threshold amount (e.g., 5% of the pixel values have changed).

The techniques discussed herein improve the operation of a computing device by making it easier for users to identify locations of video content to seek to. The display of session information when the user is seeking forward or backward through video content provides visual feedback to the user of relevant information in the video content, allowing the user to more quickly identify the location he or she is looking for when seeking forward or backward through video content. This quick identification of the location the user is looking for provides for efficient use of computational resources by reducing the amount of time computational resources are expended in providing a seek display to users.

Furthermore, the techniques discussed herein provide an automated system for generating session information for different locations of the video content. No manual tagging of information or locations in the video content need be performed by a user, author, or distributor of the video content.

Term Descriptions

These term descriptions are provided for purposes of example only and are not intended to be construed as limiting on the scope of the claims.

The term "video content" refers to a sequence of multiple frames of video data that can be displayed as video. The underlying event that is displayed as the video content can be, for example, a sporting event, a conference with a panel of several different speakers at a table, and so forth.

The term "session information" refers to information that is displayed as part of video content and that describes, for a particular location in the video content, what is currently happening in the video content at that particular location. The session information includes text, images, or other symbols describing the current action or event occurring at a particular location in the video content. For example, if the video content is a sporting event, then the session information can include the teams or players playing in the sporting event, a score of the sporting event, a time remaining or elapsed in the sporting event, combinations thereof, and so forth. By way of another example, if the video content is a conference with a panel of several different speakers at a table, then the session information can include one or both of the name of the current speaker and the current topic that is being discussed.

The term "game information card" refers to a type of session information that describes, for a particular location in video content that is a sporting event, what is currently happening in the sporting event at that particular location. For example, the game information card can include the teams or players playing in the sporting event, a score of the sporting event, a time remaining or elapsed in the sporting event (or a portion of the sporting event such as a period, quarter, or half), a team currently in possession of the ball, a player that is currently serving, combinations thereof, and so forth.

The term "thumbnail" refers to, for a particular location in the video content, a small version of the frame of video content at that particular location. For example, the thumbnail can be an image that is the frame of video content at that particular location but is 10-20% of the size of the frame of video content at that particular location.

The term "seek bar" refers to a line or bar that represents the duration of video content and that allows a user to seek forward or backward through the video content. The user can provide various inputs, such as dragging a slider across the seek bar or entering a seek forward or seek backward gesture, to seek forward or backward through the video content. At any given location along the seek bar, a thumbnail of the video content at that location is displayed adjacent to (e.g., above) the seek bar.

The term "significant content location" refers to a location in video content that is predicted to be significant to a user viewing the video content. For example, if the video content is a sporting event, then a location in the video content where a score change occurs can be a location that is predicted to be significant to the user. By way of another example, if the video content is a conference with a panel of several different speakers at a table, then a location in the video content where the current speaker or current topic changes can be a location that is predicted to be significant to the user.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
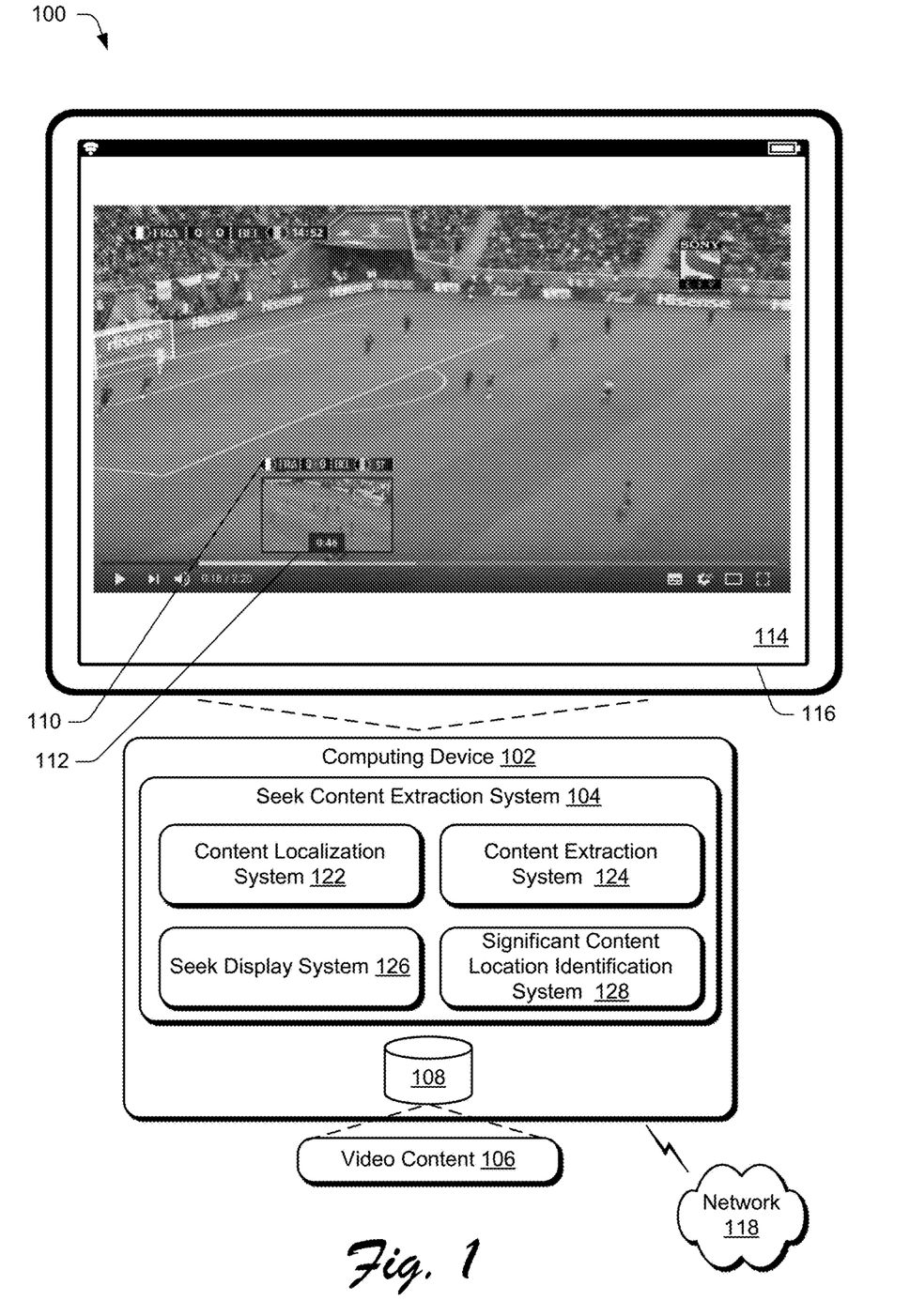
FIG. 1 is an illustration of a digital medium environment in an example implementation that is operable to employ the extracting session information from video content to facilitate seeking techniques described herein.

FIG. 1 is an illustration of a digital medium environment 100 in an example implementation that is operable to employ the extracting session information from video content to facilitate seeking techniques described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 8.

Figure 8:
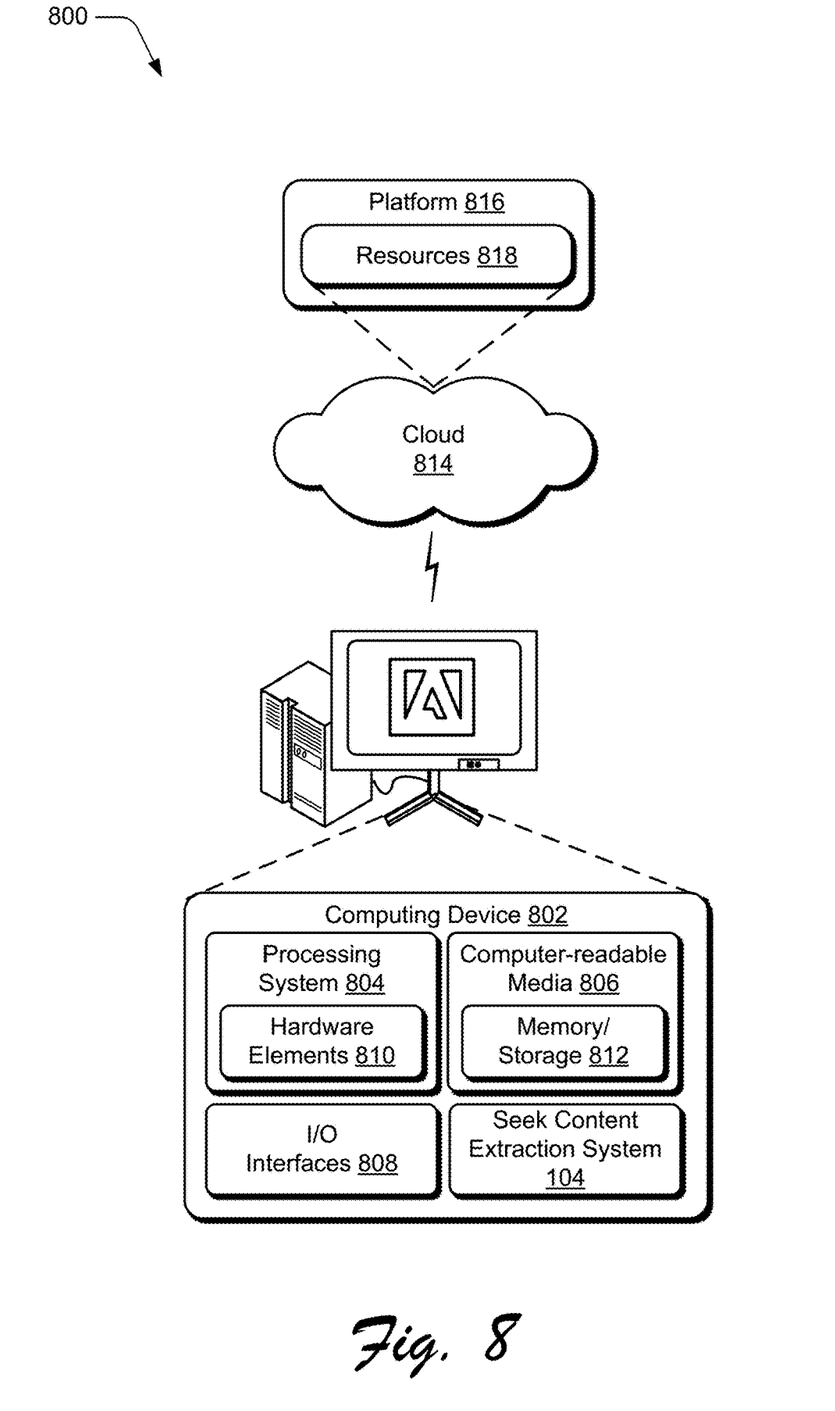
FIG. 8 illustrates an example system including various components of an example device that can be implemented as any type of computing device as described and/or utilize with reference to FIGS. 1-7 to implement aspects of the techniques described herein.

The computing device 102 is illustrated as including a seek content extraction system 104. The seek content extraction system 104 is implemented at least partially in hardware of the computing device 102 to process and transform video content 106, which is illustrated as maintained in storage 108 of the computing device 102. Such processing includes creation of images 110 associated with thumbnails 112 of the video content 106, and rendering of the images 110 associated with thumbnails 112 of the video content 106 in a user interface 114 for output, e.g., by a display device 116. Each image 110 includes session information for the associated thumbnail, and displaying of session information as discussed herein includes displaying of an image 110. The storage 108 can be any of a variety of different types of storage, such as random access memory (RAM), Flash memory, solid state drive, magnetic disk drive, and so forth. Although illustrated as implemented locally at the computing device 102, functionality of the seek content extraction system 104 may also be implemented in whole or part via functionality available via the network 118, such as part of a web service or "in the cloud."

An example of functionality incorporated by the seek content extraction system 104 to process the video content 106 is illustrated as a content localization system 122, a content extraction system 124, a seek display system 126, and a significant content location identification system 128. The content localization system 122 implements functionality to identify, for a given frame of video content 106, a region in the frame where session information is displayed. The content extraction system 124 implements functionality to extract, for each of multiple frames of the video content 106, the session information from the frame. The seek display system 126 implements functionality to maintain the session information extracted from the frames of the video content 106 by the content extraction system 124. The seek display system 126 displays the session information for a frame as the image 110 associated with a thumbnail 112 of a frame of the video content 106. The significant content location identification system 128 identifies locations in the video content 106 that are predicted by the significant content location identification system 128 to be significant to a user.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Seek Content Extraction System Architecture

Figure 2:
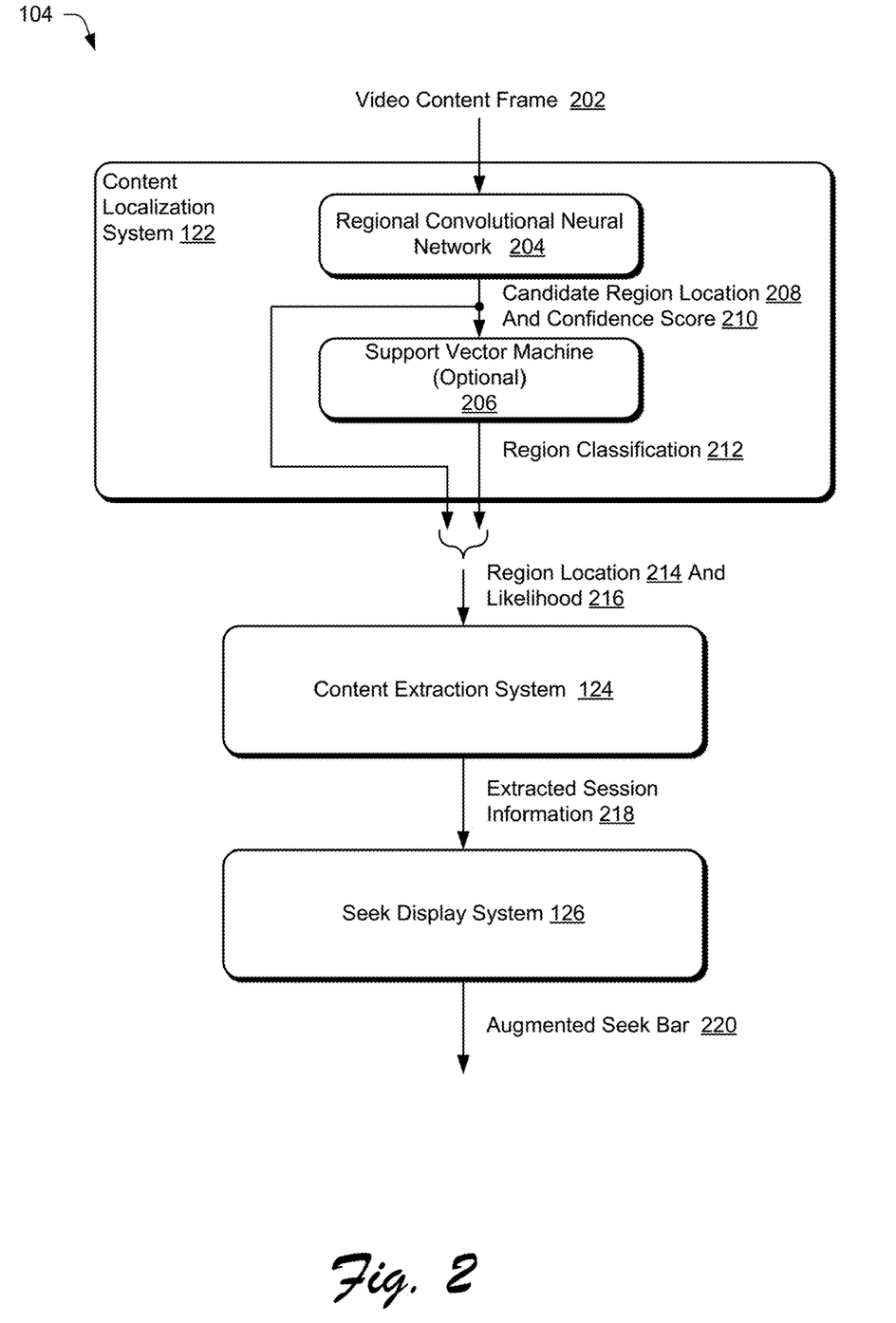
FIG. 2 is an illustration of an example architecture of a seek content extraction system.

FIG. 2 is an illustration of an example architecture of a seek content extraction system 104. The seek content extraction system 104 includes a content localization system 122, a content extraction system 124, and a seek display system 126. The seek content extraction system 104 receives a video content frame 202 and implements functionality to generate, from the video content frame 202, session information for display along with a thumbnail of the frame.

Figure 3:
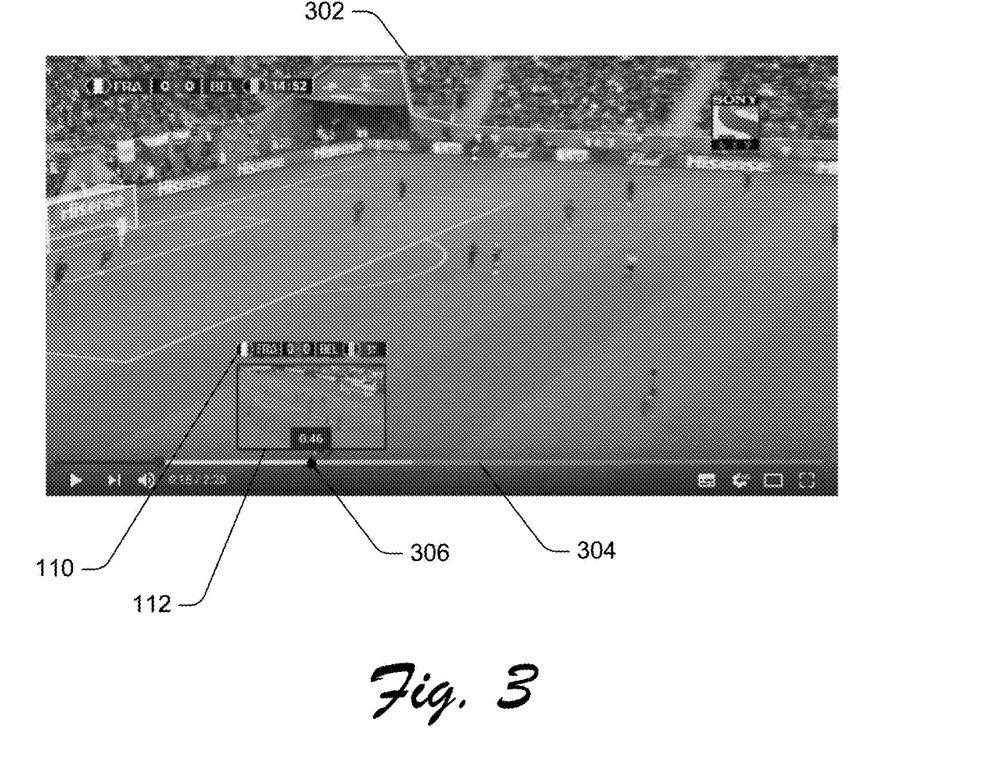
FIG. 3 illustrates an example video content frame and seek bar display.

FIG. 3 illustrates an example video content frame and seek bar display. A video content frame 302 is shown, with the video content capturing a sporting event (a portion of a soccer game). A seek bar 304 is displayed overlaid on the video content frame 302 allowing a user to seek forward and backward through the video content. The user can provide various inputs to control the forward and backward seeking, such as dragging a slider across the seek bar 304, selecting a "fast forward" or "rewind" button, entering a seek forward or seek backward gesture, providing a seek forward or seek backward voice input, and so forth.

As the user seeks forward or backward through the video content, for a given location on the seek bar 304 the seek display system 126 displays a thumbnail of the video content frame at that location along with an image that is the session information associated with that frame. The thumbnail and the session information are from the same frame, and thus the session information is also referred to as associated with the thumbnail. As illustrated in FIG. 3, at a location 306 on the seek bar 304 the seek display system 126 displays a thumbnail 112 of a frame of the video content at location 306 and an image 110 that is the session information associated with the frame of the video content at location 306.

Figure 4:
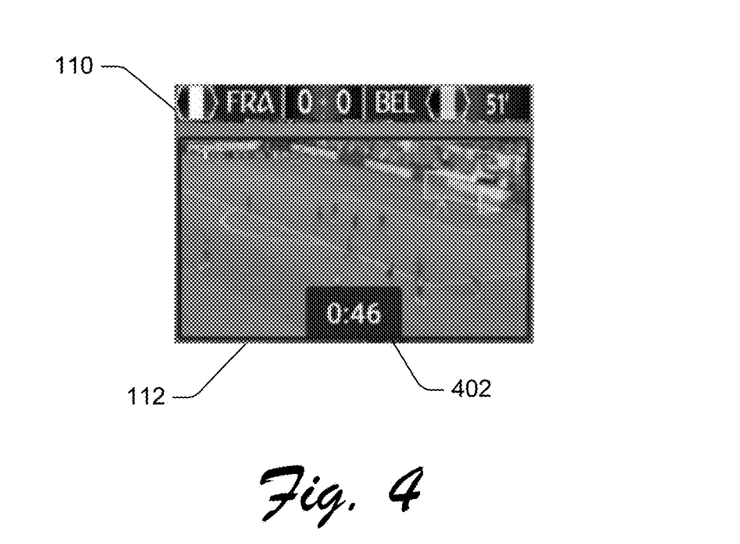
FIG. 4 illustrates an example of a thumbnail and session information in additional detail.

FIG. 4 illustrates an example of the thumbnail and session information in additional detail. The thumbnail 112 is a small image of the video content at the location 306. A timestamp 402 illustrates how far into the video content the location 306 is (46 seconds in the illustrated example). The session information displayed in the image 110 includes various information regarding the game at the location 306 of the video content, identifiers of the teams playing (France and Belgium in the illustrated example), the score at the location 306, and an amount of time that has elapsed in the soccer game at the location 306 (51 minutes in the illustrated example).

Figure 5:
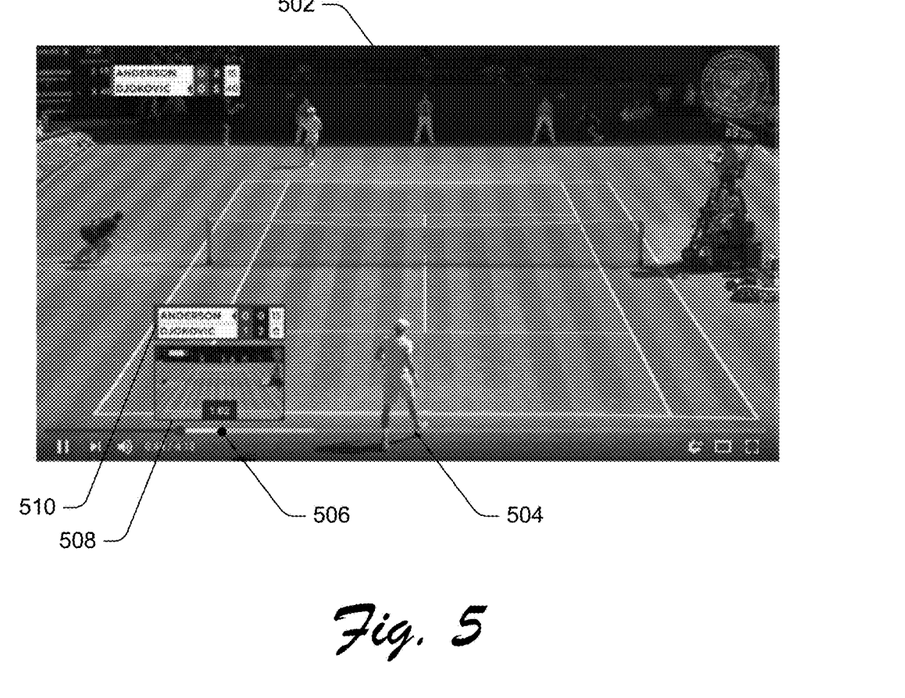
FIG. 5 illustrates another example video content frame and seek bar display.

FIG. 5 illustrates another example video content frame and seek bar display. A video content frame 502 is shown, with the video content capturing a sporting event (a portion of a tennis match). A seek bar 504 is displayed overlaid on the video content frame 502 allowing a user to seek forward and backward through the video content. As the user seeks forward or backward through the video content, for a given location on the seek bar 504 the seek display system 126 displays a thumbnail of the video content frame at that location along with an image that is the session information associated with that frame. As illustrated in FIG. 5, at a location 506 on the seek bar 504 the seek display system 126 displays a thumbnail 508 of a frame of the video content at location 506 and an image 510 that is the session information associated with the frame of the video content at location 506. The session information displayed in the image 510 includes identifiers of the players in the match (Anderson and Djokovic in the illustrated example) at the location 506 of the video content, the set distribution for the match at the location 506 of the video content (0 to 1 in the illustrated example), the game distribution for the current set at the location 506 of the video content (0 to 2 in the illustrated example), and the score for the current game at the location 506 of the video content (15 to 0 in the illustrated example).

Returning to FIG. 2, the content localization system 122 can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

In the illustrated example, the content localization system 122 employs an R-CNN illustrated as R-CNN 204 and optionally an SVM illustrated as SVM 206. A convolutional neural network (CNN) is formed from layers of nodes (i.e., neurons) and can include various layers such as an input layer, an output layer, and one or more hidden layers such as convolutional layers, pooling layers, activation layers, fully connected layers, normalization layers, and so forth. An R-CNN is a CNN that identifies one or more objects (using one or more bounding boxes) in an image. An SVM is a supervised learning model that assigns new inputs (e.g., regions of a video content frame) to one of two categories (e.g., "is session information" and "is not session information" in the content localization system 122).

Although the content localization system 122 is discussed herein as employing an R-CNN and optionally an SVM, it should be noted that the R-CNN 204 and the SVM 206 are examples, and that different types of machine learning systems can additionally or alternatively be employed by the content localization system 122.

The R-CNN 204 is trained to generate, from an input video content frame 202, an output that is the location 208 of a candidate region of the frame that is the session information as well as a confidence score 210 indicating how likely it is that the candidate region is the session information for the frame. The R-CNN 204 is trained on a set of training data. The training data includes multiple different frames of video content and can include any number of frames of video content, such as thousands or tens of thousands of frames of video content. For example, a particular number (e.g., 300) of different frames from each of a particular number (e.g., 50) of pieces of video content can be used as the training data. The session information for some of the frames in the training data is the same (e.g., players and scores have not changed), while the session information for other frames in the training data have changed (e.g., scores have changed, amount of time remaining or elapsed in the game has changed, and so forth). Furthermore, the location of the session information in some frames of the training data is the same while the location of the session information in other frames of the training data is different.

In one or more implementations, for each frame of video content in the training data, multiple variations of the frame are used. These multiple variations can include different orientations (e.g., one version without rotating the frame, another version with the frame rotated 90 degrees, another version with the frame rotated 180 degrees, and another version with the frame rotated 270 degrees), different croppings of the image (e.g., one version without cropping the frame, another version cropped to include just the left half of the frame, another version cropped to include just the right half of the frame, another version cropped to include just the top half of the frame, another version cropped to include just the bottom half of the frame, another version cropped to exclude the edges of the frame (such as the outermost 10% of the pixels along each side of the frame), etc.), and so forth.

In one or more implementations the type of video content used for training the R-CNN 204 is the type of video content for which the seek content extraction system 104 is expected to be used to extract session information from. For example, if the seek content extraction system 104 is expected to be used to extract session information from sporting events, then video content including sporting events is the video content used to train the R-CNN 204.

The R-CNN 204 includes various filters with weights that, during training, are tuned (e.g., trained) to minimize the loss between the known region locations in the training data frames and the candidate region locations generated by the R-CNN 204. Any of a variety of loss functions or algorithms can be used to train the R-CNN 204, such as a cross entropy loss function, a mean squared error, and so forth. Once trained, the R-CNN 204 generates a location 208 of a candidate region of the frame that is the session information as well as a confidence score 210 indicating how likely it is that the candidate region is the session information for the frame. The candidate region location 208 can be specified in various different manners, such as coordinates of two opposite corners of a rectangular region, a center and radius of a circular region, coordinates of each corner of a region, and so forth.

The SVM 206 is trained to assign (classify) a region of a video content frame as either "session information" or "not session information". The region of the video content frame is the candidate region 208 generated by the R-CNN 204. The SVM 206 is trained on a set of training data. In one or more implementations, the SVM 206 is trained on the same set of training data as the R-CNN 204. Additionally or alternatively, the SVM 206 can be trained on a different set of training data than the R-CNN 204.

The SVM 206 is a model that represents the regions of video content frames as points in space that are mapped so that the regions are divided by a clear and wide separation. Any of a variety of optimization procedures can be used to identify this separation, such as the Sequential Minimal Optimization (SMO) method. Once trained, the SVM 206 classifies a candidate region location 208 generated by the R-CNN 204 as either "session information" or "not session information", and generates the region classification 212 indicating whether the candidate region at the location 208 is the session information for the video content frame 202.

As indicated above, the SVM 206 is optional. Accordingly, in some implementations the content localization system 122 does not include the SVM 206. Furthermore, in some implementations the SVM 206 generates the region classification 212 only in certain situations. Various different rules or criteria can be used to determine whether the SVM 206 generates the region classification 212 for a given video content frame 202.

For example, in one or more implementations the SVM 206 determines whether to generate the region classification 212 based on the confidence score 210 for the candidate region location 208. If the confidence score 210 is at least a threshold amount (e.g., 50%), then the SVM 206 does not generate the region classification 212. Rather, the content localization system 122 assumes that the candidate region location 208 is correct given the high confidence score 210. However, if the confidence score 210 is not at least a threshold amount (e.g., 50%), then the SVM 206 generates the region classification 212. In such situations the content localization system 122 is not confident enough in the candidate region location 208, and thus the SVM 206 generates the region classification 212 to confirm or verify that the candidate region location 208 is correct.

The content localization system 122 outputs a region location 214 and likelihood value 216 that is an indication of the likelihood that the candidate region identified by the R-CNN 204 is the session information for the video content frame 202. The region location 214 is the candidate region location 208. In situations in which the SVM 206 generates the region classification 212 for the video content frame 202, the likelihood value 216 is the region classification 212 generated by the SVM 206. In situations in which the SVM 206 is not present or does not generate the region classification 212 for the video content frame 202, the likelihood value 216 is the confidence score 210 generated by the R-CNN 204.

The content extraction system 124 extracts the session information from the video content frame 202. The content extraction system 124 extracts the session information from the region location 214 by copying the content in the region at the region location 214. This extracted session information 218 is provided to the seek display system 126. It should be noted that the content extraction system 124 extracts the session information from the frame of video content that is displayed rather than from closed captioning data or other metadata associated with the frame of video content that is displayed.

In one or more implementations the content extraction system 124 determines whether to extract session information from the video content frame 202 based on the likelihood value 216 that the candidate region is the session information for the video content frame 202. If the likelihood value 216 indicates that the region is the session information for the video content frame 202 (e.g., the confidence score 210 is at least a threshold amount, such as 50%, or the region classification 212 indicates that the candidate region is classified as "session information", then the content extraction system 124 copies the video content in the candidate region at the candidate region location 208 as the session information for the video content frame 202.

However, if the likelihood value 216 indicates that the region is not the session information for the video content frame 202 (e.g., the confidence score 210 is not at least a threshold amount, such as 50%, or the region classification 212 indicates that the candidate region is classified as "not session information"), then the content extraction system 124 does not copy the video content in the candidate region at the candidate region location 208 as the session information for the video content frame 202. Rather, the content extraction system 124 determines that there is no session information for the video content frame 202.

The seek display system 126 maintains the extracted session information 218 for each video content frame 202 from which session information is extracted. The seek display system 126 can maintain the extracted session information 218 in various different manners, such as storing the extracted session information 218 as metadata associated with the video content frame 202 or associated with a thumbnail of the video content frame 202, storing the extracted session information 218 in a database or record along with an identifier (e.g., a frame number or timestamp of) the video content frame 202 or thumbnail of the video content frame 202, displaying the extracted session information 218 along a seek bar along with the thumbnail for the video content frame 202, combinations thereof, and so forth.

In one or more implementations, the seek display system 126 displays an augmented seek bar 220. The augmented seek bar 220 is a line or other identifier of the duration of the video content along with both the thumbnails and the session information associated with particular frames of the video content being displayed for different locations along the seek bar. The session information displayed as part of the augmented seek bar 220 can be extracted from the video content frames as the user seeks forward or backward through the video content, or can have been previously extracted and stored as associated with the video content frames for display as the user seeks forward or backward through the video content.

The thumbnails that are displayed as part of the augmented seek bar 220 can be generated by the seek display system 126, by another module or system of the seek content extraction system 104, by another module or system of the computing device 102, combinations thereof, and so forth. The thumbnails can be generated using any of a variety of public and/or proprietary techniques.

As discussed above, the thumbnail corresponding to any given location of the video content 106 is a small image (e.g., 10-20% of the size of the video content display) of the video content 106 at that location. It should be noted that the video content 106 includes the session information, and thus the thumbnail will also include the session information. However, given the small size of the thumbnail, the session information in the thumbnail is typically not readable by the user. However, by extracting the session information from the video content and displaying an image of the session information (e.g., along with the thumbnail), the extracted session information is large enough to be readable to the user. For example, the size of the extracted session information displayed as the image 110 can be the same size (or within a threshold amount, such as 10% of the size) of the session information included in the displayed video content 106.

The seek content extraction system 104 can extract session information from various different frames of video content. Which frames of the video content are selected for session information extraction can be determined by the content localization system 122, by another module or system of the seek content extraction system 104, by another module or system of the computing device 102, combinations thereof, and so forth.

In one or more implementations the seek content extraction system 104 extracts session information at a particular rate, such as once every 30 frames. This rate can be fixed or can be changed in response to various events. For example, each time the seek content extraction system 104 extracts session information for a frame, the extracted session information can be compared to the previously extracted session information (for the next most recent frame for which session information was extracted). If the difference between the current extracted session information and the previously extracted information is less than a threshold amount (e.g., less than 5% of the pixel values have changed) for at least a threshold number of frames (e.g., 10 frames), then the rate at which the seek content extraction system 104 extracts session information is decreased (e.g., from once every 30 frames to once every 60 frames). This decreasing of the rate can continue until a lower threshold rate (e.g., once every 300 frames) is met. However, if the difference between the current extracted session information and the previously extracted information is greater than a threshold amount (e.g., greater than 5% of the pixel values have changed) for at least a threshold number of frames (e.g., 10 frames), then the rate at which the seek content extraction system 104 extracts session information is increased (e.g., from once every 60 frames to once every 30 frames). This increasing of the rate can continue until an upper threshold rate (e.g., once every 30 frames) is met.

By decreasing the rate at which the seek content extraction system 104 extracts session information computational resources are used more efficiently because resources are not expended to extract session information when the session information is not changing very frequently. However, this rate is increased when the session information is changing more frequently, expending the additional computational resources to provide accurate session information to the user.

In situations in which session information is not extracted for every frame of the video content, the seek display system 126 can display the session information for a previous or subsequent frame. For example, if session information is extracted at a rate of once every 30 frames, then session information is extracted for the 30$^{th}$ frame of video content, the 60$^{th}$ frame of video content, the 90$^{th}$ frame of video content, and so forth. If the user is seeking forward through the video content and stops or pauses at the 75th frame of video content, then the seek display system 126 can display as the session information for the 75th frame of video content the session information for the next frame for which session information was extracted (the 90th frame) or the previous frame from which session information was extracted (the 60th frame).

Returning to FIG. 1, the seek content extraction system 102 also optionally includes a significant content location identification system 128. The significant content location identification system 128 identifies locations in the video content 106 that are predicted by the significant content location identification system 128 to be significant to a user. For example, a location in the video content 106 where a score change occurs can be a location that is predicted to be significant to a user.

The significant content location identification system 128 expects the session information to not change too frequently, so changes in the session information can be used to identify when something has happened in the video content 106 that is predicted to be significant to the user. The significant content location identification system 128 identifies significant content locations by identifying changes in the extracted session information for two frames. For example, each time the seek content extraction system 104 extracts session information for a frame, the extracted session information can be compared to the previously extracted session information (for the most recent frame for which session information was previously extracted). If the difference between the current extracted session information and the previously extracted information is less than a threshold amount (e.g., less than 5% of the pixel values have changed), then the frame from which the current extracted session information was extracted is predicted to be a significant content location. However, if the difference between the current extracted session information and the previously extracted information is greater than a threshold amount (e.g., greater than 5% of the pixel values have changed), then the frame from which the current extracted session information was extracted is not predicted to be a significant content location.

The significant content location identification system 128 maintains a record of the significant content locations in the video content 106. This record can be maintained in various manners, such as in metadata associated with the video content, in a separate record or database associated with the video content 106, and so forth. The seek display system 126 can also use this record of the significant content locations in the video content 106, displaying an indication of the significant content locations on the seek bar. These displayed indications signify to the users locations in the video content 106 that are predicted by the significant content location identification system 128 to be significant locations in the video content 106.

Figure 6:
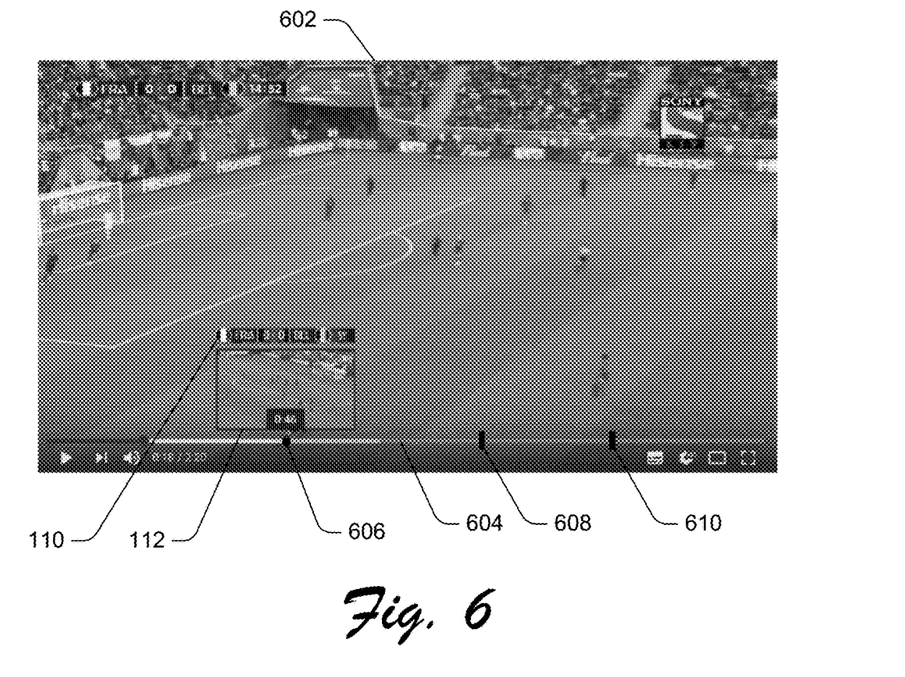
FIG. 6 illustrates another example video content frame and seek bar display.

FIG. 6 illustrates another example video content frame and seek bar display. A video content frame 602 is shown, with the video content capturing a sporting event (a portion of a soccer game). A seek bar 604 is displayed overlaid on the video content frame 602 allowing a user to seek forward and backward through the video content. At a location 606 on the seek bar 604 the seek display system 126 displays a thumbnail 112 of a frame of the video content at location 606 and an image 110 that is the session information associated with the frame of the video content at location 606. The seek bar 604 is similar to the seek bar 304 of FIG. 3, except that the seek bar 604 includes significant content location indications 608 and 610. Each of significant content locations indications 608 and 610 identifies a location in the video content that is predicted by the significant content location identification system 128 to be a significant locations in the video content.

By identifying the significant content locations the significant content location identification system 128 uses computational resources more efficiently because resources are not expended for a user trying to find a location he or she desires. The user can quickly see where the significant content locations are (e.g., as displayed by the indications on the seek bar 604) and seek to those locations quickly, alleviating the use of computational resources to display multiple further thumbnails and session information while the user attempts to find the location of the video content he or she is interested in.

Example Procedures

The following discussion describes techniques that may be implemented utilizing the previously described systems and devices. Aspects of the procedure may be implemented in hardware, firmware, software, or a combination thereof The procedure is shown as a set of blocks that specify operations performed by one or more devices and are not necessarily limited to the orders shown for performing the operations by the respective blocks. In portions of the following discussion, reference will be made to FIGS. 1-6.

Figure 7:
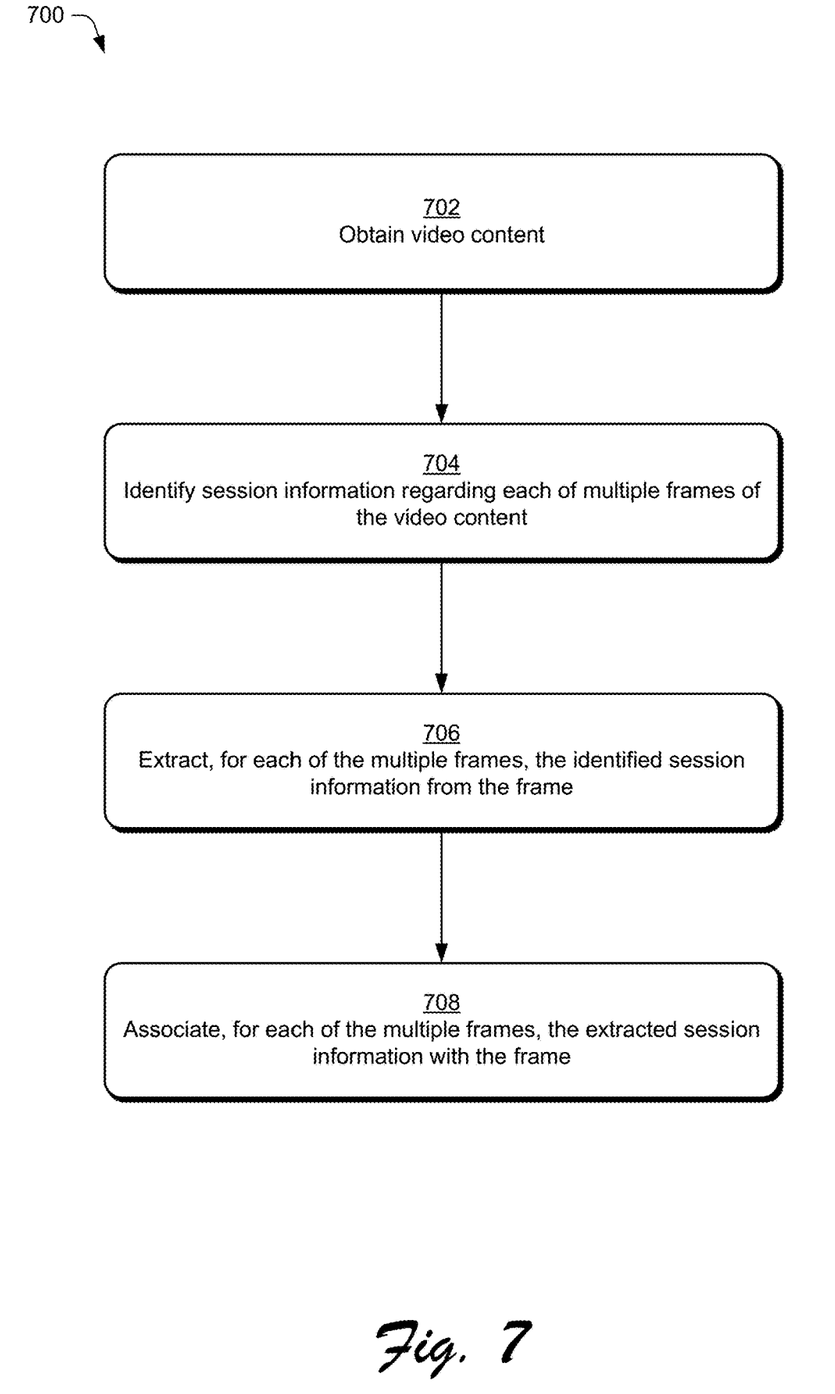
FIG. 7 is a flow diagram depicting a procedure in an example implementation of extracting session information from video content to facilitate seeking.

FIG. 7 is a flow diagram depicting a procedure in an example implementation of extracting session information from video content to facilitate seeking. In this example, video content is obtained (block 702). The video content can be obtained from one or more of a variety of different sources, such as from storage 108, from a remote storage device (e.g., accessed via the network 118), from a video content transmission service or device, and so forth.

Session information regarding each of multiple frames of the obtained video content is identified (block 704). The session information is identified using one or more machine learning systems, such as an R-CNN and an SVM as discussed above.

For each of the multiple frames, the identified session information is extracted from the frame (block 706). The session information is extracted from a frame by copying the session information from a region location identified by the one or more machine learning systems in block 704.

Additionally, for each of the multiple frames, the extracted session information is associated with the frame from which the session information was extracted (block 708). This association can be made in one or more of various manners as discussed above, such as storing the extracted session information as metadata of the frame, displaying the extracted session information along with a thumbnail of the frame, and so forth.

Example System and Device

FIG. 8 illustrates an example system generally at 800 that includes an example computing device 802 that is representative of one or more computing systems and/or devices that may implement the various techniques described herein. This is illustrated through inclusion of the seek content extraction system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to facilitate seeking through video content, a method implemented by at least one computing device, the method comprising:
   obtaining video content;
   identifying, for each of multiple frames of the video content, a region of the frame that includes session information regarding the frame, the session information comprising information that is displayed as part of the frame and that describes what is currently happening in the video content at the frame;
   for each of the multiple frames of the video content:
      extracting the session information from the frame by copying the video content in the region and using the copied video content as the session information, and associating the extracted session information with the frame;
   determining, for each of a threshold number of frames of the multiple frames, a difference between first session information extracted from a current frame of the multiple frames and second session information extracted from a previous frame of the multiple frames;
   decreasing a rate at which session information is extracted from the multiple frames in response to the difference between the first session information and the second session information exceeding a threshold amount for the threshold number of frames; and
   increasing the rate at which session information is extracted from the multiple frames in response to the difference between the first session information and the second session information not exceeding the threshold amount for the threshold number of frames.

2. The method as recited in claim 1, wherein the associating comprises storing the extracted session information as associated with the frame.

3. The method as recited in claim 1, wherein the associating comprises displaying the extracted session information with a thumbnail of the frame.

4. The method as recited in claim 3, where the displaying comprises displaying the extracted session information with the thumbnail of the frame along a seek bar.

5. The method as recited in claim 4, further comprising:
   identifying significant locations in the video content that are predicted to be significant to a user; and
   displaying indications of the significant locations on the seek bar.

6. The method as recited in claim 1, wherein the video content is a sporting event and wherein the session information extracted from a particular frame comprises a game information card that includes a score of the sporting event at the particular frame and a time remaining or a time elapsed in the game.

7. The method as recited in claim 1, wherein the video content is a conference and wherein the session information extracted from a particular frame comprises a speaker name and current topic at that particular frame.

8. The method as recited in claim 1, wherein the extracting the session information from the frame comprises extracting the session information from the frame using a machine learning system.

9. The method as recited in claim 8, wherein the using a machine learning system comprises using a regional convolutional neural network to generate a location of a candidate region and a confidence score indicating how likely it is that the candidate region is the session information for the frame, and wherein the extracting the session information from the frame comprises extracting the session information from the frame only in response to the confidence score exceeding a threshold amount.

10. The method as recited in claim 9, further comprising:
    using, as the session information for a first frame of the multiple frames for which the extracted session information from the frame did not result in a confidence score exceeding the threshold amount, the session information from a second frame of the multiple frames for which the extracted session information from the frame did result in a confidence score exceeding the threshold amount.

11. The method as recited in claim 8, wherein the using a machine learning system comprises using a regional convolutional neural network to generate a location of a candidate region and a confidence score indicating how likely it is that the candidate region is the session information for the frame, and further comprises using a support vector machine to verify that the candidate region is the session information for the frame only in response to the confidence score being less than a threshold amount.

12. The method as recited in claim 1, the decreasing comprising decreasing the rate at which session information is extracted from the multiple frames in response to determining that less than a threshold number of pixel values having changed for at least the threshold number of frames.

13. In a digital medium environment to facilitate seeking through video content, a computing device comprising:
    a processor; and
    computer-readable storage media having stored thereon multiple instructions that, responsive to execution by the processor, cause the processor to perform operations including:
       identifying, for each of multiple frames of video content, a region of the frame that includes session information regarding the frame, the session information comprising information that is displayed as part of the frame and that describes what is currently happening in the video content at the frame;

for each of the multiple frames of the video content:
  extracting the session information from the frame by copying the video content in the region and using the copied video content as the session information, and
  associating the extracted session information with the frame;

determining, for each of a threshold number of frames of the multiple frames, a difference between first session information extracted from a current frame of the multiple frames and second session information extracted from a previous frame of the multiple frames;

decreasing a rate at which session information is extracted from the multiple frames in response to the difference between the first session information and the second session information exceeding a threshold amount for the threshold number of frames; and increasing the rate at which session information is extracted from the multiple frames in response to the difference between the first session information and the second session information not exceeding the threshold amount for the threshold number of frames.

14. The computing device as recited in claim 13, wherein the video content is a sporting event and wherein the session information extracted from a particular frame comprises a game information card that includes a score of the sporting event at the particular frame.

15. The computing device as recited in claim 13, wherein the extracting the session information from the frame comprises using a regional convolutional neural network to generate a location of a candidate region and a confidence score indicating how likely it is that the candidate region is the session information for the frame, and extracting the session information from the frame comprises extracting the session information from the frame only in response to the confidence score exceeding a threshold amount.

16. The computing device as recited in claim 13, wherein the extracting the session information from the frame comprises using a regional convolutional neural network to generate a location of a candidate region and a confidence score indicating how likely it is that the candidate region is the session information for the frame, and further comprises using a support vector machine to verify that the candidate region is the session information for the frame only in response to the confidence score being less than a threshold amount.

17. A system comprising:
  means for identifying, for each of multiple frames of video content, a region of the frame that includes session information regarding the frame, the session information comprising information that is displayed as part of the frame and that describes what is currently happening in the video content at the frame;
  means for extracting, for each of the multiple frames of the video content, the session information from the frame by copying the video content in the region and using the copied video content as the session information, and associating the extracted session information with the frame; and
  means for increasing or decreasing a rate at which the session information is extracted from the multiple frames based on a difference between session information extracted from a threshold number of frames.

18. The system as recited in claim 17, wherein the means for associating the extracted session information with the frame comprises means for displaying the extracted session information with a thumbnail of the frame.

19. The system as recited in claim 17, wherein the means for extracting the session information from the frame comprises a regional convolutional neural network used to generate a location of a candidate region and a confidence score indicating how likely it is that the candidate region is the session information for the frame.

20. The system as recited in claim 17, wherein the means for extracting the session information from the frame comprises a regional convolutional neural network used to generate a location of a candidate region and a confidence score indicating how likely it is that the candidate region is the session information for the frame, and a support vector machine used to verify that the candidate region is the session information for the frame only in response to the confidence score being less than a threshold amount.

* * * * *